US009679066B2

(12) United States Patent
Gupta et al.

(10) Patent No.: US 9,679,066 B2
(45) Date of Patent: *Jun. 13, 2017

(54) SEARCH RESULTS BASED ON AN ENVIRONMENT CONTEXT

(71) Applicant: International Business Machines Corporation, Armonk, NY (US)

(72) Inventors: Gaurav Gupta, Kanpur (IN); Arun Ramakrishnan, Tamil Nadu (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/479,401

(22) Filed: Sep. 8, 2014

(65) Prior Publication Data

US 2015/0134635 A1    May 14, 2015

Related U.S. Application Data

(63) Continuation of application No. 14/078,936, filed on Nov. 13, 2013.

(51) Int. Cl.
G06F 17/30        (2006.01)

(52) U.S. Cl.
CPC .............. *G06F 17/30867* (2013.01)

(58) Field of Classification Search
CPC .......... G06F 17/30867; G06F 17/3052; G06F 17/30864

(Continued)

(56) References Cited

U.S. PATENT DOCUMENTS 7,856,441 B1    12/2010  Kraft et al.
8,359,302 B2     1/2013  Shebanow
(Continued)

FOREIGN PATENT DOCUMENTS

CN      101083633 A      12/2007
CN      101477554 A       7/2009
(Continued)

OTHER PUBLICATIONS

International Application No. PCT/CN2014/088997; Patent Cooperation Treaty PCT, International Searching Authority, Notification of Transmittal of the International Search Report and the Written Opinion of the International Searching Authority, or the Declaration; International Search Report; Written Opinion of the International Searching Authority, dated Feb. 4, 2015.

(Continued)

*Primary Examiner* — Mahesh Dwivedi
*Assistant Examiner* — Johnese Johnson
(74) *Attorney, Agent, or Firm* — Gilbert Harmon, Jr.

(57) ABSTRACT

A computer performs a search and generates a context-aware search result. The computer crawls a plurality of servers to fetch a plurality of knowledge documents, parses the plurality of knowledge documents, and indexes the plurality of parsed knowledge documents in a search index. Parsing can include annotating at least one of the plurality of knowledge documents, and indexing can include building a term index and an annotation index. The computer receives from a requestor a search request including a search term, and requests and receives a context of an asset environment associated with the requestor. The computer determines a context-aware search result based, at least in part, on the search term, on the context, and on information stored in the search index, and transmits the context-aware search result to the requestor.

6 Claims, 4 Drawing Sheets

(58) Field of Classification Search
USPC .......................................... 707/709, 706, 722
See application file for complete search history.

(56) References Cited

U.S. PATENT DOCUMENTS

| | | | |
|---|---|---|---|
| 8,914,783 B2 | 12/2014 | Van Camp | |
| 2003/0060913 A1* | 3/2003 | Turner | G06F 17/5095 |
| | | | 700/103 |
| 2003/0163302 A1* | 8/2003 | Yin | G06F 17/2775 |
| | | | 704/9 |
| 2007/0180051 A1 | 8/2007 | Kelly et al. | |
| 2012/0239643 A1 | 9/2012 | Ekstrand et al. | |
| 2012/0269116 A1* | 10/2012 | Xing | H04L 67/22 |
| | | | 370/328 |
| 2012/0323948 A1 | 12/2012 | Li et al. | |

FOREIGN PATENT DOCUMENTS

| | | |
|---|---|---|
| CN | 102737027 A | 10/2012 |
| WO | 2006014835 A2 | 2/2006 |
| WO | 2007126634 A2 | 11/2007 |

OTHER PUBLICATIONS

Gupta et al., "Search Results Based on an Environment Context", U.S. Appl. No. 14/078,936, filed Nov. 13, 2013.

* cited by examiner

SEARCH RESULTS BASED ON AN ENVIRONMENT CONTEXT

FIELD OF THE INVENTION

The present invention relates generally to search engines, and more particularly to the relevancy of search results generated by a search engine.

BACKGROUND

The use of the Internet has become pervasive, and business entities and individuals use the Internet as a tool for obtaining information regularly. For example, such users use search engines to search numerous World Wide Web sites and online databases for information relevant to search terms. In recent years, the sophistication of search engines has improved, increasing the ability of search engines to produce search results that accurately reflect the search terms provided by the users. Search results from search engines typically present users with a large volume of information, which will have at least superficial relevance to the search terms. However, the users must still manually explore the search results until they find the information most relevant in a substantively meaningful way to what their actual interests or questions are.

SUMMARY

Embodiments of the present invention provide for a program product, system, and method in which a computer performs a search and generates a context-aware search result. The computer crawls a plurality of servers to fetch a plurality of knowledge documents, parses the plurality of knowledge documents, and indexes the plurality of parsed knowledge documents in a search index. Parsing can include annotating at least one of the plurality of knowledge documents, and indexing can include building a term index and an annotation index. The computer receives from a requestor a search request including a search term, and requests and receives a context of an asset environment associated with the requestor. The computer determines a context-aware search result based, at least in part, on the search term, on the context, and on information stored in the search index, and transmits the context-aware search result to the requestor.

DETAILED DESCRIPTION

Figure 1:
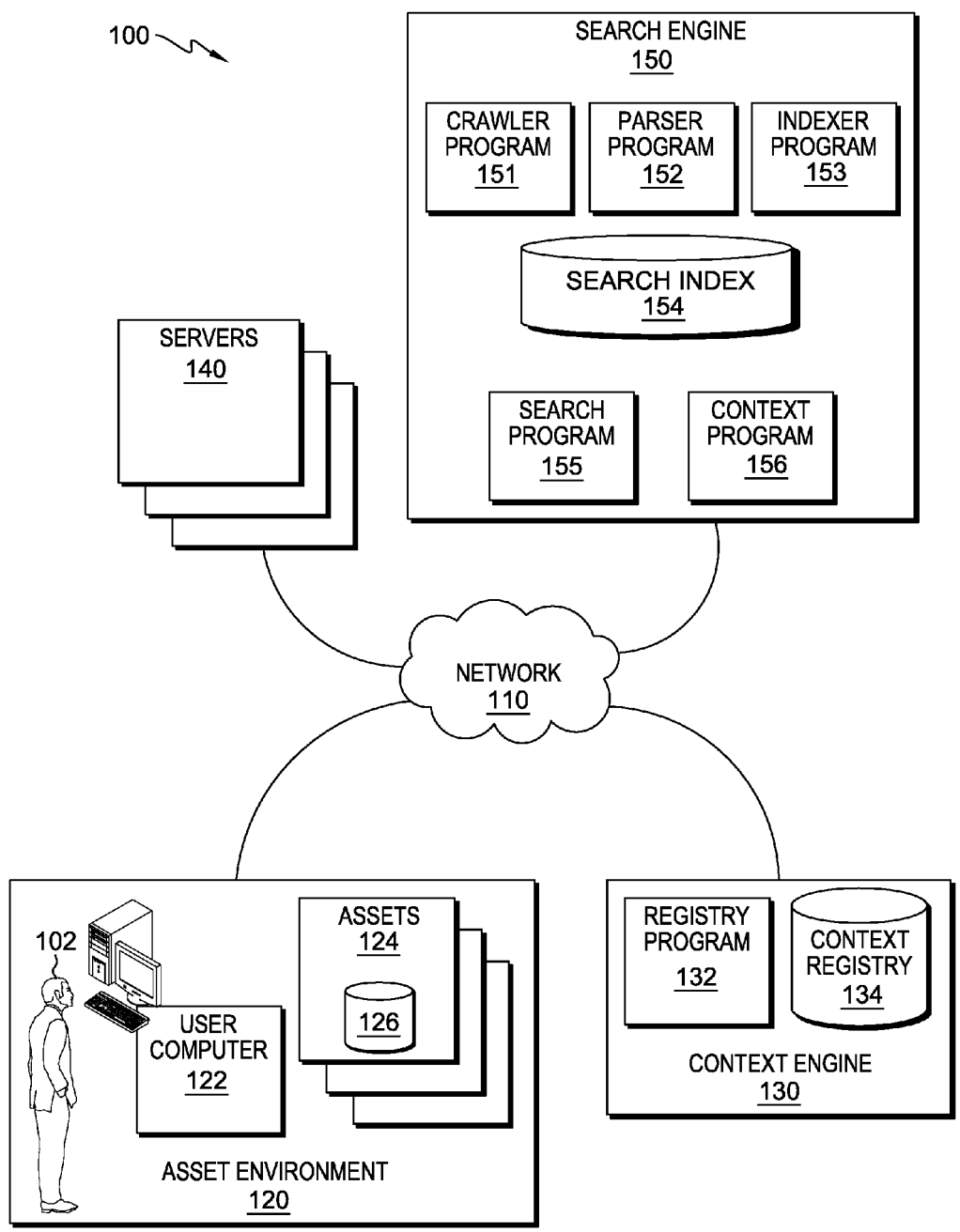
FIG. 1 is a block diagram of a distributed computing environment in accordance with an embodiment of the present invention.

According to techniques introduced herein, assets are hardware products, software products, and/or other resources. In some embodiments, a user's assets are registered to a central registry by a provider, along with additional information such as each asset's relationship with other assets registered in the registry. In some embodiments, the providers expose each asset's identify information, configuration information, content information and environment information by exposing a link to it through the resources and providers. Further, knowledge documents (e.g., web pages, online user manuals, etc.) are indexed by a search engine and can be tagged with "association rules" (also sometimes herein referred to as "context rules"). An association rule maps a knowledge document to an asset, an asset configuration information, asset content information and/or environment information (collectively herein referred to as "context"). For purposes of association rules, an asset, itself, will generally be identified by a product identifier. Environmental information and/or asset configuration may include information like operating system or specific configuration status. In a variation, relationships between knowledge documents and context, which are embodied in association rules, can be derived through "annotators" during indexing by the search engine. An association rule may, for example: relate a product identifier to a knowledge document (sometimes referred to herein as a "product rule"); associate environment to a knowledge document (sometimes referred to herein as an "environmental rule"); associate a knowledge document to an asset's configuration (sometimes referred to herein as a "configurational rule"); associate a knowledge document to an asset's content (sometimes referred to herein as a "content rule"); or associate a knowledge document based on a combination of the foregoing types of context (sometimes referred to herein as a "hybrid rule"). The relationship between a given knowledge document, and contextual facts relevant to that particular knowledge document, can be evaluated to derive the association rules during annotation by the search engine.

Further according to techniques introduced herein, a user (e.g., a programmatic or human user, etc.) can query the search engine for a combination of keywords. The search engine queries the search index for the required keywords and builds up a preliminary search result for all possibilities where those keywords are found. Based on the search results, the search engine queries the registry, and its linked data through the providers, to retrieve context information for the user who made the search request. The search engine processes the preliminary search results against the context information with reference to the association rules to rank (or re-rank) or prioritize (or re-prioritize) the search results into a set of final search results that are based, at least in part, upon the user's context information (e.g., by considering assets in the environment and their interrelations or interdependencies, etc.). The final search results relatively rank the search results according to a combination of the following considerations: search engine result ranking criteria; and the user's context as applied to the search results (e.g., through the association rules, etc.). This can produce context-aware search results ranked as per the user's actual needs by reading the user's current context, thereby improving the chances of the user finding the right information while searching.

Further according to the techniques introduced herein, linked data can be used in an IT (information technology) environment to improve a user's search for information. When search results are found, the search system queries a central registry to locate products/applications that are available in the environment. The system contacts products, using a linked data approach, to find out further information and generate a context for the IT environment based on the search query that was fired by a user. With this context, the search results are then ranked better to give more important to results that are more relevant to the IT environment context. Search results, or documents, may be associated with further rules/policies to locate further context and related information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) Java may be subject to trademark and/or service mark rights in various jurisdictions throughout the world, and, to that extent, references to this term(s) herein are to be taken to exclusively apply only to legitimate products of the trademark/service mark owner(s)), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor (i.e., a computing processor) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram of distributed computing environment 100 in accordance with an embodiment of the present invention is shown. Distributed computing environment 100 includes network 110, asset environment 120, context engine 130, servers 140, and search engine 150. Network 110 can be, for example, a local area network (LAN), a wide area network (WAN) such as the Internet, or a combination of the two, and can include wired or wireless connections. In general, network 110 can be any combination of connections and protocols that will support communications between asset environment 120, context engine 130, servers 140, and search engine 150 in accordance with an embodiment of the invention. As will be discussed in detail below, person 102, a user in distributed computing environment 100 (and, optionally, also in asset environment 120), can utilize user computer 122 to search for a search term using search engine 150, and can receive a context-aware search result generated by search engine 150. Search engine 150 generates the context-aware search result based on information about servers 140, as well as on information about the context of asset environment 120 registered in context engine 130.

In various embodiments, user computer 122 and each of assets 124 in asset environment 120, context engine 130, each one of servers 140, and search engine 150 can include a laptop, tablet, or netbook personal computer, a desktop computer, a personal digital assistant, a smart phone, a mainframe computer, or a networked server computer. Further, each of assets 124, context engine 130, each one of servers 140, and search engine 150 can include computing systems utilizing clustered computers and components to act as single pools of seamless resources when accessed through network 110, or can represent one or more cloud computing datacenters. In general, user computer 122 and each of assets 124, context engine 130, each one of servers 140, and search engine 150 can be any programmable electronic device as described in further detail below with respect to FIG. 4.

Asset environment 120 includes user computer 122 and assets 124, and is an environment generally dedicated to the installation, deployment, use, or maintenance, etc., of various kinds of hardware and software products, resources, and other assets. For example, in one embodiment, asset environment 120 is an information technology (IT) environment that includes an installed base of personal computer workstations and their associated office, productivity, or development, etc., software, as well as an installed base of mainframe computers and their associated production, database, or server, etc., software. In another embodiment, asset environment 120 is a cloud computing environment that includes a physical or virtual collection of processors, memory, storage, and installed software, etc., for providing cloud computing services. Each one of assets 124 can have a respective data 126, which can include one or more of configuration data and content data. For example, one of assets 124 can have details about its installation, uninstallation, operational configuration (e.g., its active and inactive licenses, its enabled and disabled modules or components, etc.), operational history (e.g., its uptime, its log files, etc.), and status (e.g., nominal, failed, memory and processor usage, etc.) stored in its data 126, while another one of assets 124 can have content that it serves stored in its data 126, while yet another one of assets 124 can have both its configuration data and content data stored in its data 126. Generally, in various embodiments asset environment 120 can include assets 124 of any kind.

User computer 122 is depicted as residing in asset environment 120 with assets 124. However, such residence of user computer 122 is optional, and in another embodiment user computer 122 can be remote from asset environment 120 and assets 124. User computer 122 includes software, such as an asset management program, for managing assets 124. The management of assets 124 can involve various tasks, such as installing and uninstalling various ones of assets 124, configuring and reconfiguring various ones of assets 124, activating and deactivating licenses for various ones of assets 124, and registering and unregistering various ones of assets 124 with context engine 130, for example. User computer 122 also includes software, such as a web browser program, for interacting with search engine 150, and optionally with one or more of servers 140 and context engine 130, via network 110. For example, one or more of servers 140 can host knowledge documents viewable on the web browser program of user computer 122. For another example, the web browser program of user computer 122 can load a search interface web page from search program 155 of search engine 150, in order to make a search request. In particular, person 102 can enter a search term into the loaded search interface web page displayed by the web browser program, and the web browser program can make a search request by transmitting the search term to search program 155. Subsequently, search program 155 can generate context-aware search result as discussed in detail below.

Context engine 130 includes registry program 132 and context registry 134. Generally, during operation, registry program 132 stores contexts of assets 124 of asset environment 120 in context registry 134, and provides the context to context program 156 of search engine 150 continuously, periodically, on demand, or the like. In particular, registry program 132 can interoperate with one or more of user computer 122 and each one of assets 124 in order to register and unregister various ones of assets 124 in context registry 134. Further, registry program 132 can interoperate with context program 156 of search engine 150 to provide context stored in context registry 134, to enable search engine 150 to generate a context-aware search result, as discussed in detail below. Although FIG. 1 depicts a single asset environment 120, in other embodiments a single context engine 130 can handle registration for multiple asset environments. Further, although FIG. 1 depicts context engine 130 separately from asset environment 120, in other embodiments context engine 130 can be embedded in asset environment 120, can handle registration for only asset environment 120, or both.

Context can be stored in context registry 134 in-place, by link, or both. For example, context for one of assets 124 can be stored in-place in context registry 134 by copying the context from asset environment 120 into context registry 134. In contrast, context for another one of assets 124 can be stored by link in context registry 134 by storing a link to the original context in asset environment 120 in context registry 134. Accordingly, storing context in-place generally results in a larger context registry 134, while storing context by link generally results in a smaller context registry 134. However, retrieving context in-place from context registry 134 is generally fast and reliable, while retrieving context by link from context registry 134 can be slower and less reliable, insofar as following the link back to the original context in asset environment 120 can take more time and potentially be subject to connectivity issues and the like.

In different embodiments, the granularity of the context, stored in context registry 134, of each of assets 124 can vary. For example, in one embodiment, context is limited to a statement of whether or not a particular one of assets 124 exists in asset environment 120. In another embodiment, context is more expansive, and involves the storage of some or all details of each one of assets 124 of asset environment 120 in context registry 134. For example, in such an embodiment, a registration of a context of a particular one of assets 124 can include an asset identity information, an asset content information, an asset environment information, an asset configuration information, or the like. Further, in such an embodiment, a registration of a particular one of assets 124 includes a statement that the particular asset exists in asset environment 120, as well as a portion of, or all of, its configuration data and content data, e.g., a portion of, or all of, its installation, uninstallation, operational configuration, operational history, and status of its data 126 and the content that it serves of its data 126.

Search engine 150 includes crawler program 151, parser program 152, indexer program 153, search program 155, context program 156, and search index 154. Search program 155 provides an interface between search engine 150 and clients of search engine 150 (e.g., one or both of person 102 and user computer 122 can be regarded as clients of search engine 150, etc.). For example, search program 155 can provide an interface by transmitting a search interface web page to a web browser program of user computer 122, and then by interacting with person 102 via the search interface web page. Search program 155 also generates a context-aware search result, by utilizing context about assets 124 retrieved from context engine 130 by context program 156, as well as by utilizing data that has been stored in search index 154 by crawler program 151, parser program 152, and indexer program 153.

Crawler program 151, parser program 152, and indexer program 153 operate together to crawl, parse, and index web pages hosted on servers 140, to facilitate the handling of search requests by search program 155. The operation of crawler program 151, parser program 152, and indexer program 153 can occur continuously, as background processes, such that search requests received by search program 155 are handled using up-to-date information from ongoing crawl, parse, and index operations. Up-to-date information from the operation of crawler program 151, parser program 152, and indexer program 153 is stored in search index 154 and accessible by search program 155.

During operation, crawler program 151 locates knowledge documents (e.g., web pages, online user manuals, etc.) hosted on servers 140, fetches the knowledge documents to search engine 150, and provides the knowledge documents to parser program 152 and indexer program 153 for parsing and indexing, respectively. Crawler program 151 can crawl knowledge documents linked together with URLs by, for example, starting with a list of seed URLs, crawling the seed URLs, and adding any found URLs to the list for further crawling. In various embodiments, crawler program 151 can crawl any kind of documents, data stores, or repositories hosted on servers 140 and available for crawling by search engine 150. As crawler program 151 crawls knowledge documents hosted on servers 140, crawler program 151 provides the knowledge documents to parser program 152.

Parser program 152 can parse each knowledge document in a particular way, depending on the information content of the knowledge document. In particular, knowledge documents can include unstructured or structured information. Unstructured information is defined herein as information whose intended meaning is only implied by its form. One suitable example of unstructured information is a natural language document organized merely into sentences, paragraphs, and pages. Structured information is defined herein as information whose intended meaning is unambiguous and explicitly represented in the structure or format of the data. One suitable example is a database table. Further, knowledge documents may be annotated or not annotated, as discussed in more detail below.

During operation, parser program 152 performs search term parsing of each knowledge document, whether or not the knowledge document is structured or annotated, so that indexer program 153 can then construct a term index stored in search index 154. In particular, parser program 152 can tokenize the contents of each knowledge document provided by crawler program 151, and provide the tokenized contents to indexer program 153 for the construction of a reverse term index. A reverse term index lists each knowledge document that a given term appears in, to facilitate handling of search requests. For example, using the term index in search index 154, search program 155 can handle a search request by looking up the search term of the search request in the term index to find out which knowledge document the search term appears in, and by returning these knowledge documents to user computer 122 as a basic search result (i.e., not as a context-aware search result). As will be discussed in detail below, the utilization of context program 156 significantly augments such basic search request handling, to produce a context-aware search result.

During operation, parser program 152 can also optionally perform annotation of structured or unstructured knowledge documents that are not already so annotated, so that indexer program 153 can then construct an optional annotation index stored in search index 154 (i.e., if a given knowledge document is already so annotated, indexer program 153 can utilize it for the construction of the optional annotation index after partial or even no annotation by parser program 152). In particular, parser program 152 can annotate the contents of each knowledge document that is not already so annotated, tokenize the annotations, and provide the tokenized annotations to indexer program 153 for the construction of a reverse annotation index. A reverse annotation index lists each knowledge document that a given annotation appears in, to facilitate handling of search requests. For example, search program 155 can interact with context program 156 to retrieve a context, can look up one or both of the search term and the context in one or both of the term index and the annotation index to find out which knowledge documents the search term and the context appears in, and can return these knowledge documents to user computer 122 as a context-aware search result.

Parser program 152 can perform annotation of knowledge documents by performing text analytics on the knowledge documents. Text analytics can be performed using an Unstructured Information Management Architecture (UIMA) module of parser program 152 configured to analyze information to discover patterns. The UIMA module can include annotators, which consist of rules and dictionaries, for example, as well as an analysis structure, which provides the annotators with a facility for efficiently building and searching the analysis structure. The analysis structure is a data structure that is mainly composed of meta-data descriptive of sub-sequences of the text of the knowledge documents. For example, one type of meta-data in an analysis structure is an annotation. An annotation is an object, with its own properties, that is used to annotate a sequence of text. There are an arbitrary number of types of annotations. For example, annotations may label sequences of text in terms of their role in the knowledge document's structure (e.g., word, sentence, paragraph, etc.), or to describe them in terms of their grammatical role (e.g., noun, noun phrase, verb, adjective, etc.). Annotations may further determine the knowledge domain of a knowledge document (such domains can include a domain for each kind of asset in assets 124, etc.) Further still, annotators may identify sequences of text indicating characteristics of an asset environment such as asset environment 120, for example. There is essentially no limit on the number of, or application of, annotations. Other examples include annotating segments of text to identify them as proper names, locations, times, events, equipment, spatial conditions, temporal conditions, software interrelations, hardware interrelations, or other items of contextual significance or interest. Annotating the knowledge documents can further include determining the knowledge domain of the knowledge documents as a prelude to narrowing a range of further applicable annotators, or as a part of identifying domain-specific parts of speech in the knowledge documents, or in order to select domain-specific rules and dictionaries.

As discussed above, during operation, crawler program 151 locates knowledge documents hosted on servers 140, fetches the knowledge documents to search engine 150, and provides the knowledge documents to parser program 152 and indexer program 153 for parsing and indexing, respectively. During such operation, parser program 152 constructs a term index, and optionally constructs an annotation index, stored in search index 154. As stated above, such operation can occur continuously such that search requests received by search program 155 are handled using up-to-date information from ongoing crawl, parse, and index operations, as well as by using context about assets 124 retrieved from context engine 130 by context program 156. Below, the handling of a search request received by search program 155 will be discussed.

During operation, search program 155 receives search requests from, e.g., user computer 122. For each search request, search program 155 can interact with context program 156 to retrieve a context related to the origin of the search request, e.g., user computer 122 or asset environment 120, can process the search term, the context, and information stored in search index 154 to find out which knowledge documents are most relevant to the search term in light of the context, and can return these knowledge documents to user computer 122 as a context-aware search result. Additional details of the techniques introduced herein are provided below.

Figure 2:
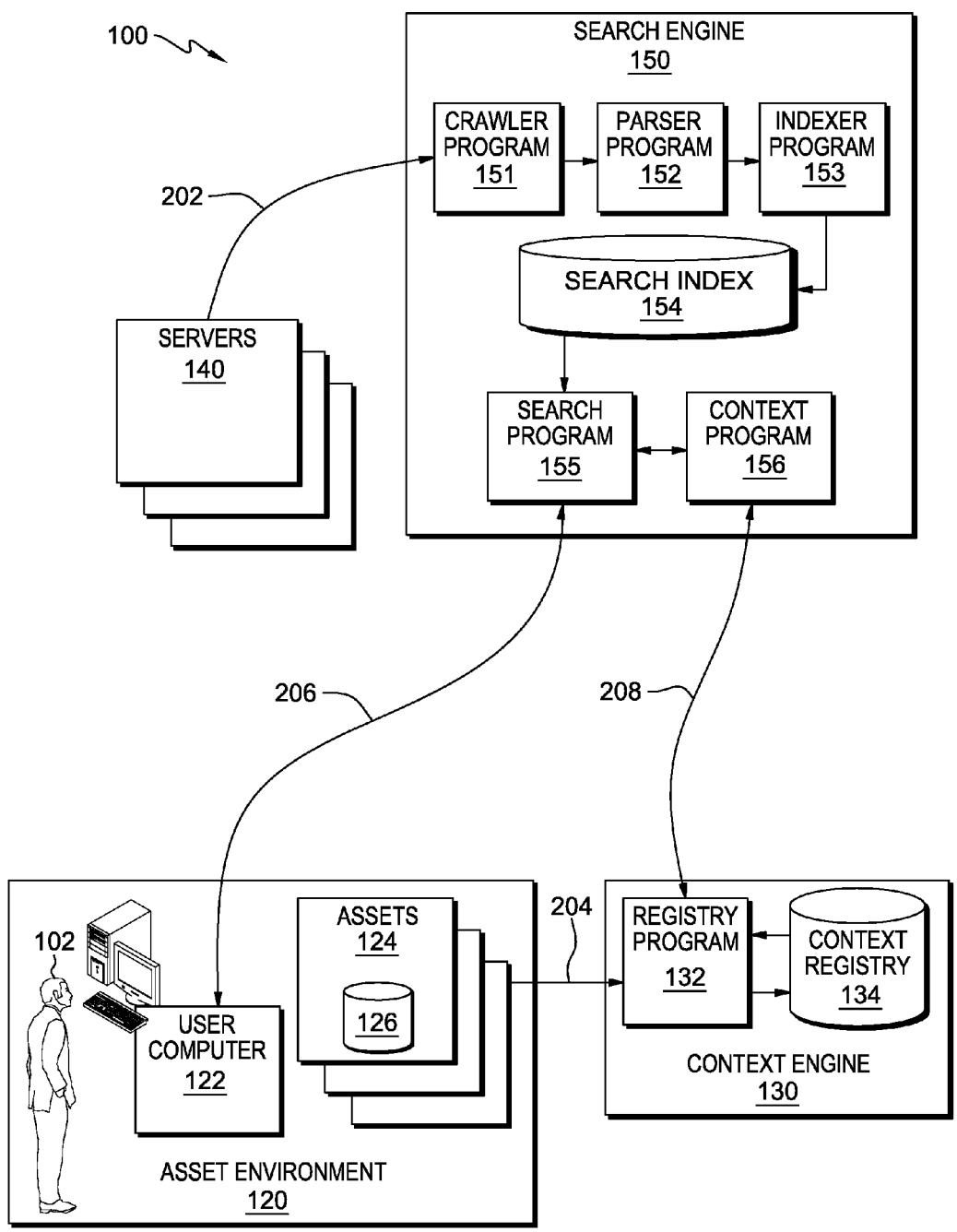
FIG. 2 is a block diagram of the distributed computing environment of FIG. 1, showing context-aware search interactions in accordance with an embodiment of the present invention.

Referring now to FIG. 2, a block diagram of distributed computing environment 100 of FIG. 1, showing context-aware search interactions 202 through 208 in accordance with an embodiment of the present invention is shown.

During interaction 202, search engine 150 crawls, parses, and indexes knowledge documents on servers 140, in order to store in search index 154 a term index and optionally an annotation index, as discussed above. Generally, interaction 202 can occur continuously as a background process, or periodically, on demand, or the like. During interaction 204, registry program 132 receives context about assets 124 in asset environment 120, as discussed above. Interaction 204 can be initiated periodically, on demand, or the like. In particular, interaction 204 can be initiated manually by person 102 using an asset management program of user computer 122, or can be initiated automatically in asset environment 120 upon detection of a change in context (e.g., the installation or reconfiguration of one of assets 124, etc.) in asset environment 120, for example. Further, interaction 204 can be initiated automatically in context engine 130 based on a schedule followed by registry program 132, for example.

During interaction 206, user computer 122 transmits a search term (e.g., as provided by person 102, etc.) to search program 155 of search engine 150. In addition to transmitting the search term, during interaction 206 an identification of asset environment 120, or an identification of user computer 122 or person 102, can also be transmitted to search program 155. Accordingly, in the context of interaction 206, user computer 122 can be regarded as a requestor of a search result, or as a requestor of a context-aware search result, for example. The identification is used subsequently, during interaction 208, for the purpose of associating, at search engine 150 or at context engine 130, the transmitter of the search term with the appropriate context stored in context engine 130. At the conclusion of interaction 206 (i.e., after interaction 208 discussed below), a context-aware search result is transmitted from search engine 150 to user computer 122.

During interaction 208, after receiving a search term from user computer 122 (i.e., from a requestor), search program 155 queries context program 156 to retrieve a context associated with the transmitter of the search term, based on an identification transmitted along with the search term. Context program 156 transmits a context request to context engine 130, and retrieves a resulting context. The context request can include the identification, enabling context engine 130 to determine the association between asset environment 120 and the requestor. If context registry 134 stores context in-place, the context is sent directly from context engine 130 to search engine 150. In contrast, if context registry 134 stores context by link, the context can be sent from context engine 130 to search engine 150 after context engine 130 retrieves it from asset environment 120, or the links can be sent from context engine 130 to search engine 150 so that search engine 150 can retrieve the context directly from asset environment 120.

Further during interaction 208, after receiving the search term and the context, search program 155 can process the search term, the context, and information stored in search index 154 to find out which knowledge documents are most relevant to the search term in light of the context, and can return these knowledge documents to user computer 122 as a context-aware search result. For example, search program 155 can look up one or both of the search term and the context in one or both of the term index and the annotation index to find out which knowledge documents one or both of the search term and the context appear in to generate a context-aware search result. For another example, search program 155 can look up the search term in one or both of the term index and the annotation index to find out which knowledge documents the search term appears in, and then can rank or prioritize the knowledge documents the search term appears in according to the context to generate a context-aware search result. In particular, in this example, search program 155 can determine that a first knowledge document that the search term appears in is not relevant to the context and thus has a low rank or priority, and can further determine that a second knowledge document that the search term appears in is relevant to the context and thus has a high rank or priority.

Accordingly, at the conclusion of interaction 208 search program 155 has generated a context-aware search result. The context-aware search result is transmitted from search engine 150 to user computer 122, to also conclude interaction 206.

Figure 3:
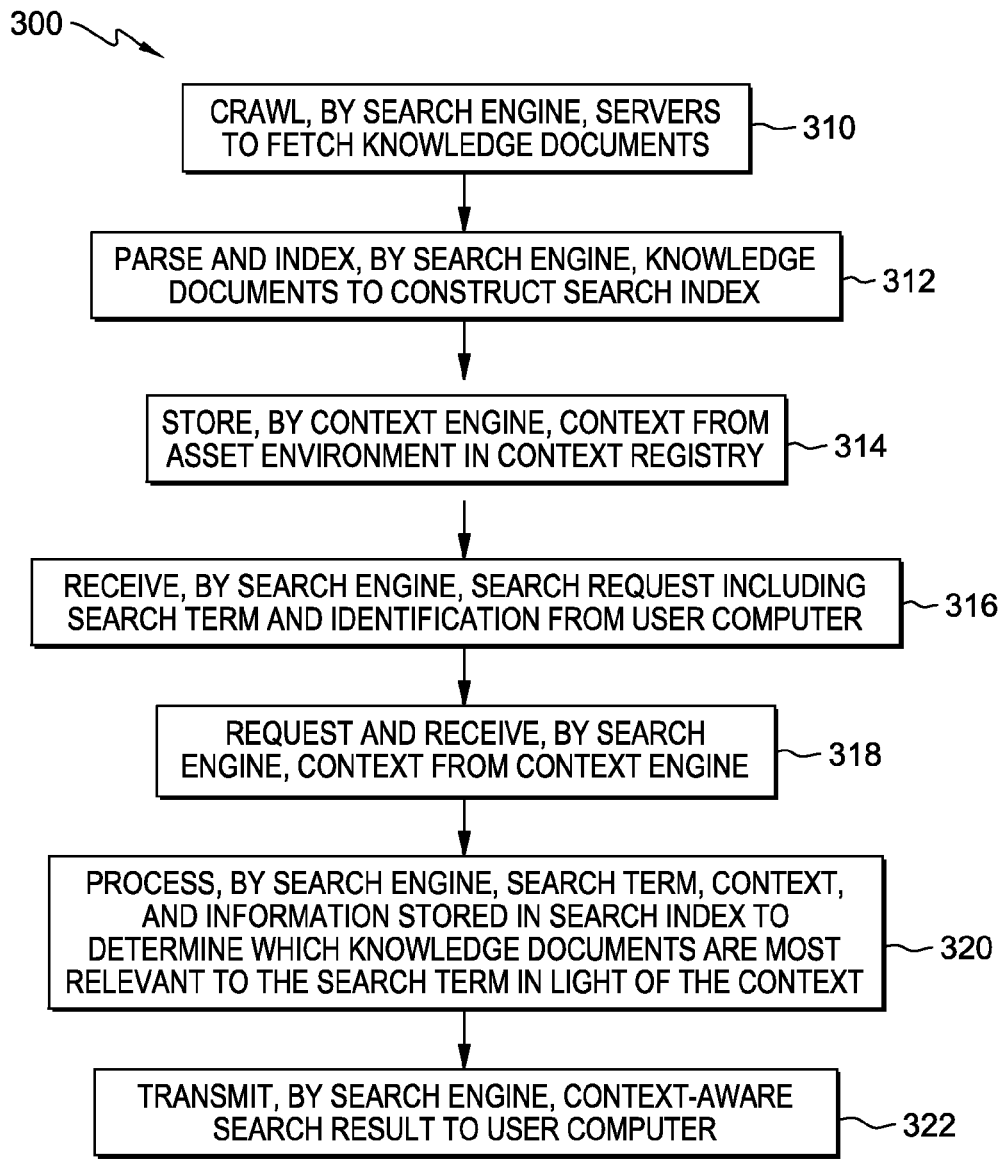
FIG. 3 is a flowchart depicting steps followed by a search engine and a context engine of the distributed computing environment of FIG. 1 in accordance with an embodiment of the present invention.

Referring now to FIG. 3, flowchart 300 depicts steps followed by search engine 150 and context engine 130 of distributed computing environment 100 in accordance with an embodiment of the present invention. In step 310, crawler program 151 of search engine 150 crawls servers 140 to fetch knowledge documents (i.e., step 310 includes a portion of interaction 202). In step 312, parser program 152 and indexer program 153 of search engine 150 parse and index the knowledge documents to construct search index 154 (i.e., step 312 includes the remainder of interaction 202). In step 314, registry program 132 of context engine 130 stores context from asset environment 120 in context registry 134 (i.e., step 314 includes interaction 204).

In step 316, search program 155 of search engine 150 receives a search request including a search term and an identification from user computer 122 (i.e., step 316 includes a portion of interaction 206). In step 318, search program 155 of search engine 150 receives and requests a context from context engine 130 (i.e., step 318 includes a portion of interaction 208). In step 320, search program 155 of search engine 150 processes the search term, context, and information stored in search index 154 to determine which knowledge documents are most relevant to the search term in light of the context (i.e., step 320 includes the remainder of interaction 208). In step 322, search program 155 of search engine 150 transmits a context-aware search result to user computer 122 (i.e., step 322 includes the remainder of interaction 206).

Figure 4:
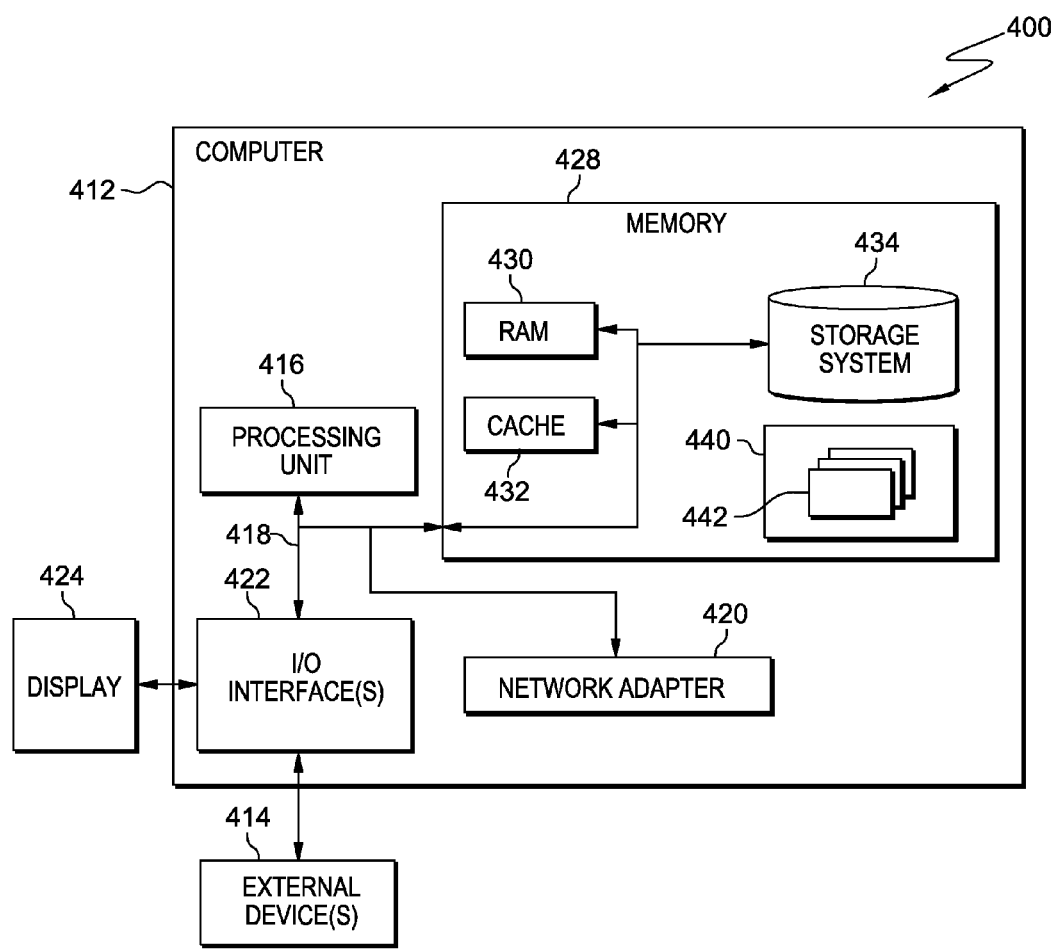
FIG. 4 is a block diagram of a computer system in accordance with an embodiment of the present invention.

Referring now to FIG. 4, a block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. User computer 122 and each of assets 124, context engine 130, each one of servers 140, and search engine 150, can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Crawler program 151, parser program 152, indexer program 153, search program 155, context program 156, registry program 132, and each of assets 124 can be implemented as or can be an instance of program 440.

Computer 412 may also communicate with one or more external devices 414 such as a keyboard, a pointing device, or one or more devices that enable a user to interact with computer 412, such as via a user interface on display 424; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining a search result, the method comprising:

tagging a plurality of knowledge documents with a plurality of association rules mapping the plurality of knowledge documents to one or more assets in an asset environment, wherein the plurality of association rules include at least one product rule associating an asset identifier with a knowledge document, at least one environment rule associating an environment with a knowledge document, and at least one configuration rule associating an asset configuration with a knowledge document;

receiving, by a processor and from a requestor, a search request including a search term;

transmitting an asset context request to a context engine, wherein the context engine maintains a context registry of the plurality of association rules for the one or more assets in the asset environment;

receiving, by the processor, an asset context of an asset environment, wherein the asset environment is associated with the requestor, and wherein the asset context includes at least one of an asset identity information, an asset content information, an asset environment information, and an asset configuration information;

determining, by the processor, a context-aware search result based, at least in part, on the search term, on the asset context, and on information stored in a search index; and transmitting, by the processor, the context-aware search result to the requestor.

2. The method of claim 1, further comprising:

receiving, by the processor, an identification of the requestor; and determining, by the processor, the association between the asset environment and the requestor based on the received identification.

3. The method of claim 1, further comprising:

receiving, by the processor, an identification of the requestor; and transmitting, by the processor, the identification of the requestor to a context engine for determination of the association between the asset environment and the requestor based on the received identification.

4. The method of claim 1, further comprising:

crawling, by the processor, a plurality of servers to fetch a plurality of knowledge documents;

parsing, by the processor, the plurality of knowledge documents; and indexing, by the processor, the plurality of parsed knowledge documents in a search index.

5. The method of claim 4, wherein the parsing the plurality of knowledge documents includes annotating at least one of the plurality of knowledge documents.

6. The method of claim 4, wherein the indexing the plurality of knowledge documents includes building an annotation index.

* * * * *